United States Patent [19]

Spitzer et al.

[11] 4,059,311
[45] Nov. 22, 1977

[54] PROCESS FOR DISCHARGING BULK MATERIAL FROM A SILO

[75] Inventors: Artur Spitzer, Mosbach, Baden; Hartmut Biedert, Sulzbach, both of Germany; Fritz Gramlich, deceased, late of Mosbach, Baden, Germany, by Ute Gramlich, legal representative

[73] Assignee: Spitzer Silo-Fahrzeugwerk KG, Mosbach, Baden, Germany

[21] Appl. No.: 680,663

[22] Filed: Apr. 27, 1976

[30] Foreign Application Priority Data

Apr. 30, 1975  Luxembourg .......................... 72387

[51] Int. Cl.$^2$ ...................... B65G 53/66; B65G 53/38
[52] U.S. Cl. ...................................... 302/53; 222/195
[58] Field of Search .................... 302/53, 54, 35, 42; 222/195; 259/DIG. 17

[56] References Cited

U.S. PATENT DOCUMENTS 1,971,852  8/1934  Goebels ............................ 302/53

FOREIGN PATENT DOCUMENTS 2,440,015  4/1976  Germany ............................ 302/53

Primary Examiner—Evon C. Blunk
Assistant Examiner—Jeffrey V. Nase
Attorney, Agent, or Firm—Peter K. Kontler

[57] ABSTRACT

During evacuation of the contents of a silo through a pneumatic product conveyor line, the internal pressure is controlled continuously. The internal pressure rises in the event of clogging. As soon as the internal pressure exceeds a critical value, an additional volume of air is admitted into the clogged area to break up the accumulation.

8 Claims, 1 Drawing Figure

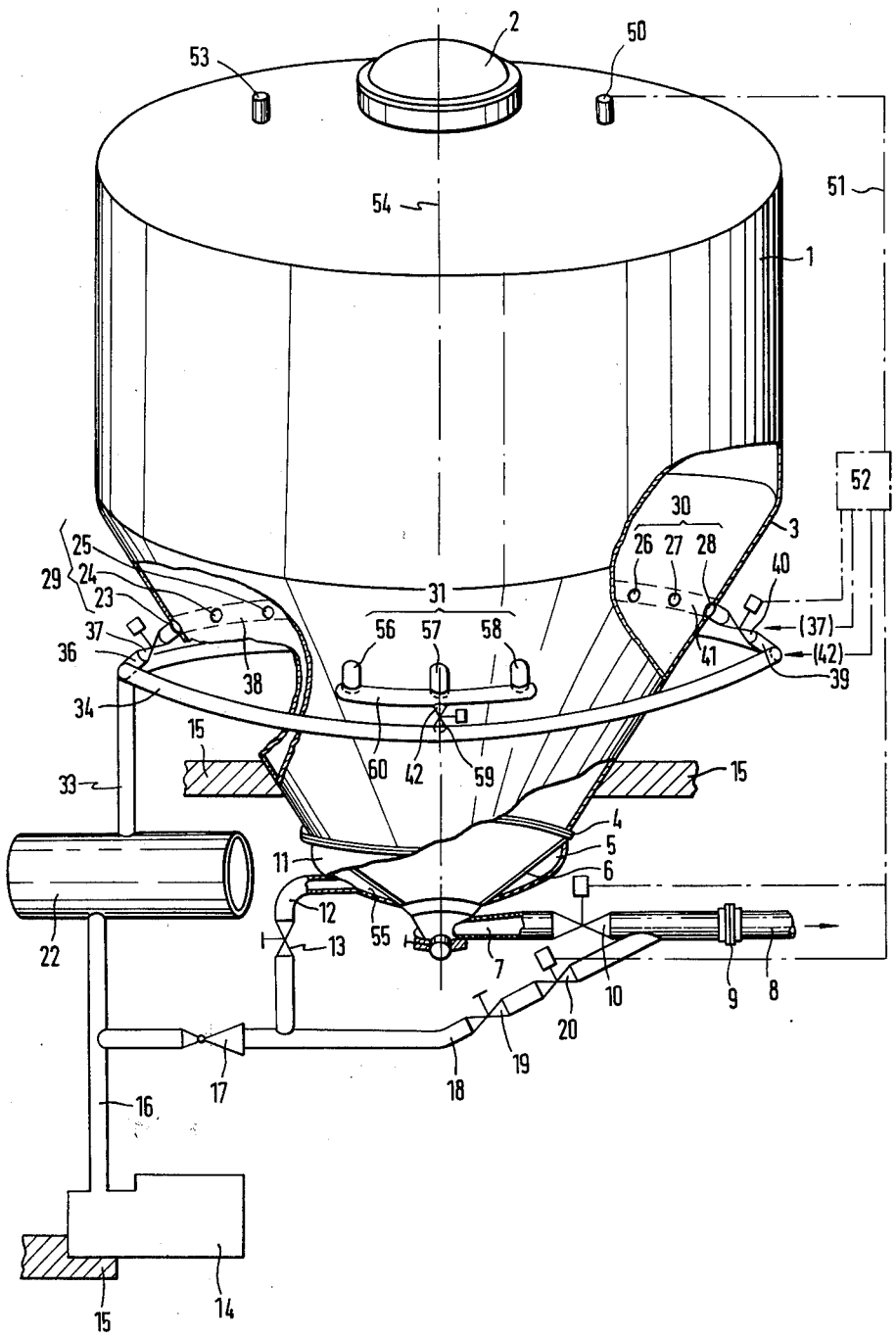

ated to the cylinder axis 54 and tapers downwards with a hopper 3 on a flange 4 to which is flanged an outlet 5. The outlet 5 has a wall forming an air chute 6 made from a porous fabric and tapering conically downwards as a continuation of the hopper 3, whereby the pores of the wall do not permit the passage of the loose material. This air chute 6 communicates with an outlet connection 7 which is angled at the bottom and to which is coupled a pneumatic product conveyor line 8 by means of a coupling 9. An electromagnetically adjustable shutoff valve 10 is provided in the outlet connection 7. The air chute 6 is surrounded by a metal pan 11 so that an annular channel 55 is formed around the air chute which, if one disregards the porosity of the fabric, is closed in air-tight manner and leads into a compressed air pipe 12. The pipe 12 contains a manually operable throttle and shutoff valve 13. The reference character 14 denotes an air

PROCESS FOR DISCHARGING BULK MATERIAL FROM A SILO

BACKGROUND OF THE INVENTION

The invention relates to a process for discharging pneumatically conveyable loose material (also known as bulk material) from a conically downwardly tapering hopper (outlet) of an internal pressure-loadable silo into a pneumatic product conveyor line by means of compressed air which is blown through and loosens the material. Compressed air is admitted into the hopper via an air chute along the walls in the area of the hopper opening and via nozzles in the hopper walls above the air chute.

In a known process of this type, air is optionally blown into the silo either via the air chute or via the nozzles, or both via the air chute and via the nozzles, in order to loosen the product therein. The operating pressure in the silo uses as a result of admission of air, and the product is discharged into the product conveyor line.

There are a large number of loose materials, particularly those with organic constituents such as, for example, bacteriochemically prepared compost, which tend to clog the silo. Loose materials of this type form bridges extending from one wall to the other in the tapering hopper, as well as chimneys which extend through the entire loose material down into the hopper opening. Consequently, the conveyor air finds the path of least resistance and flows past the loose material into the product conveyor line without carrying with it any noteworthy quantities of loose material.

Attempts have been made to break up obstructions in pneumatic loose material conveyor systems by blowing in compressed air surges into the obstructed area. Air speeds close to the speed of sound have been used in this connection.

OBJECT AND SUMMARY OF THE INVENTION

An object of the invention is to provide an economical process for breaking up bridge and chimney-forming configurations occurring in silos of the above indicated type.

The invention is characterised in that the product conveyor line is closed when the pressure in the silo drops below a predetermined minimum operating pressure, and that for an interval of 0.5 to 1 second, preferably 0.5 seconds, a limited quantity of air is discharged through the nozzles with an air-feed capacity which is five to twenty times, and preferably ten times as large as is necessary effective conveying of the product in the product conveyor line, that the product conveyor line is opened again as soon as the normal operating pressure between a maximum and the minimum operating pressure is reached within the silo, and that on a time average the total quantity of air entering the silo in this way is at most the same as that required for effective conveying of the product in the product conveyor line.

The invention is based on the discovery that in such bridge and chimney-forming configurations the surge-like admission of a considerable volume of air has an optimum action relative to consumption, probably because it is trapped in the clogged loose material, breaks it up and surges back into the free space above the hopper. Another factor which is responsible for the action is that the chimney-forming loose materials involved here often have a very high permeability to air, so that under certain circumstances ten to twenty times more air is required in order to obtain the same loosening effect as connection with normal loose materials such as, for example, sand. Thus, according to the invention, the process includes blowing in a considerable volume of air for a short interval of time in order to prevent a weakening of the loosening effect owing to high permeability of processed material to air. Unlike in the known attempts, extremely high air speeds are not necessary. Air speeds of 100 meters per second have proved completely adequate so that the high expenditure necessary for achieving air speeds close to the speed of sound is not required with the present invention.

In the process according to the invention, the quantity of air blown into the silo with the air surge also contributes to conveying away the product in the product conveyor line so that the air is used twice. This is advantageous in view of the limited quantity of compressed air generally available in practical operation. The rise of air pressure in the silo to operating pressure can be accelerated by closing the product conveyor line during the collapse phase.

The invention is preferably practiced in conjunction with mobile silos which are mounted on a vehicle and are supplied with compressed air by a vehicle compressor. If the compressor is designed in such a way that it barely provides the necessary quantities of air for the product conveyor line at a pressure higher than the maximum operating pressure, it is sufficient to intermediately store part of air at the higher pressure in an air chamber from which it can, if necessary, be discharged for the purpose of producing the air surges. The process can also be practiced by using existing installations and involves only minimal additional expenditures.

BRIEF DESCRIPTION OF THE DRAWING

The single FIGURE is a perspective view of an apparatus which can be utilized for the practice of the process, certain components of the apparatus being partly broken away.

DESCRIPTION OF THE PREFERRED EMBODIMENTS

The invention will be explained with reference to the attached drawing, further examples being shown in the Table.

In the drawing, the reference character 1 denotes a partly broken away internal pressure-loadable silo whose feed opening is covered by a lid 2. The silo 1 is circular-cylindrical with respect to the cylinder axis 54 and tapers downwards with a hopper 3 on a flange 4 to which is flanged an outlet 5. The outlet 5 has a wall forming an air chute 6 made from a porous fabric and tapering conically downwards as a continuation of the hopper 3, whereby the pores of the wall do not permit the passage of the loose material. This air chute 6 communicates with an outlet connection 7 which is angled at the bottom and to which is coupled a pneumatic product conveyor line 8 by means of a coupling 9. An electromagnetically adjustable shutoff valve 10 is provided in the outlet connection 7. The air chute 6 is surrounded by a metal pan 11 so that an annular channel 55 is formed around the air chute which, if one disregards the porosity of the fabric, is closed in air-tight manner and leads into a compressed air pipe 12. The pipe 12 contains a manually operable throttle and shutoff valve 13. The reference character 14 denotes an air compressor which like the silo 1, is mounted on a lorry, whose chassis is designated by the reference numeral 15. The outlet of the compressor 14 supplies compressed air at 6 atm. (Superatmospheric pressure) into a discharge pipe 16 to which is connected the compressed air pipe 12 and a further pipe 18, with the interposition of a pressure reducing valve 17 which reduces the pressure to 2 atm. The maximum air feed capacity of the compressor is 22 liters per second at 6 atm, corresponding to 140 liters per second at normal pressure. Pipe 18 has a manually operable throttle and shutoff valve 19 and an electromagnetically adjustable shutoff valve 20 downstream of the valve 19. This pipe communicates with the outlet connection 7 downstream of the valve 10 and serves as a bypass. The discharge pipe 16 is further connected to an air chamber 22.

The reference numerals 23 to 28 designate six nozzles which, together with three further nozzles 56, 57, 58, are peripherally distributed above the air chute 6 in the wall of more hopper 3, and more specifically at the levels where experience has shown that the bridge and chimney-forming loose material configurations are laterally supported. The nine nozzles form three groups. The nozzles 23, 24, 25 form the first group 29, the nozzles 26, 27, 28 the second group 30, and the nozzles 56, 57, 58 the third group 31. A pipe 33 which extends from the air chamber 22 leads to a closed circuit pipeline 34 which has three branches. Branch 36 leads to a distributor 38 via an electromagnetically adjustable shutoff valve 37, and from there to the three nozzles of the first nozzle group 29. Branch 39 leads via an electromagnetically adjustable shutoff valve 40 to a distributor 41 and from there to the three nozzles of the second group 30. Branch 59 leads via an electromagnetically adjustable shutoff valve 42 to a distributor 60 and from there to the three nozzles of the third group 31.

A pressure sensor 50 measures the pressure in the silo 1 and transmits signals via line 51, shown by phantom lines, to a control device 52. This control device responds to two different pressures, namely to the minimum operating pressure which in this embodiment is 1 atm and to the normal operating pressure, in this embodiment 1.7 atm. In addition, a safety valve 53 on the silo 1 responds to the maximum operating pressure, in this embodiment 2 atm, and opens when the maximum operating pressure is reached to insure that the internal pressure in the silo never exceeds 2 atm. When the operating pressure drops below the minimum value, the device 52 closes the two electromagnetically adjustable shutoff valves 10 and 20 and opens one of the normally closed electromagnetically adjustable shutoff valves 37, 40 or 42, in each case for 0.5 seconds. As soon as the normal operating pressure is reached, the control device 52 closes whichever of the shutoff valves 37, 40 or 42 has just opened so that now once again all three shutoff valves are closed and the shutoff valves 10 and 20 are opened.

The air chamber 22 has a capacity of 100 liters and the silo a capacity of 5 cubic meters. The inner diameters of pipes leading from air chamber 22 to the individual groups of nozzles 29, 30 and 31 are sufficiently large to permit 80% of the quantity filling the air of air chamber 22 at a pressure superatmospheric of 6 atm pressure to flow into the silo via that particular group of nozzles which have been opened for a period of 0.5 seconds. Thus, in these 0.5 seconds 80 liters of compressed air at 6 atm, corresponding to 280 liters based on a pressure of 1 atm, flow into the silo. To maintain the pneumatic feed in the product conveyor line 8, 24 liters per second are required at 1 atm. The quantity of air blown from air chamber 22 during the aforementioned interval of 0.5 seconds therefore flows at an air feed capacity which is ten times that necessary for conveying the product. The speed at which this quantity of air is propagated after being discharged from the nozzles of the particular group of nozzles activated is 100 liters per second immediately after leaving the nozzle openings, and then rapidly drops to lower values. However, these speeds are not decisive for the sought after effect; what is decisive is the large volume of air blown in with an air surge.

The arrangement is operated as follows; In the initial state, the lid 2 is closed and the silo 1 is filled with loose material which is to be conveyed away pneumatically through the product conveyor line 8. The electromagnetically adjustable shutoff valves 37, 40, and 42 are closed, compressor 14 is switched on and fills the air chamber 22 with compressed air at 6 atm. By means of the manually operable throttle and shutoff valve 13, the volume of air required for the air chute 6 is manually regulated and if this is not sufficient for admission of material into the product conveyor line 8, the bypass 18 is opened in metered manner by the manually operable throttle and shutoff valve 19 until the volume of air passing into the product conveyor line 8 is adequate for a completely satisfactory feed. The two electromagnetically adjustable shutoff valves 10 and 20 are closed. The normal operating pressure of 1.7 atm now builds up in the silo, and as soon as this pressure is reached, the shutoff valves 10 and 20 open and the loose material passes into the product conveyor line 8 to be conveyed away by air from pipes 12 and 18. The outflowing loose material is caused to slide along the air chute 6 in the lower area of the hopper 3 and is also loosened by the upwardly bubbling air. As soon as a chimney is formed, it impairs the further loose material outflow because the compressed air now finds the path of least resistance along the chimney through the loose material and into the product conveyor line 8. The air passing through the manually operable throttle and shutoff valve 13 does not suffice to maintain the normal operating pressure in the silo. Instead, the pressure falls and as soon as it reaches the minimum operating pressure of 1 atm, the control device 52 responds and closes the product conveyor line 8 and the bypass 18 by closing the electromagnetically adjustable shutoff valves 10 and 20. Simultaneously therewith, the control device 52 briefly opens, in the present embodiment for 0.5 seconds, one of the shutoff valves 37, 40 or 42. A quantity of air now flows through the corresponding group of nozzles from air chamber 22 into the loose material area in which the chimney-forming loose material configurations have probably developed by clogging and the inflowing air breaks up the chimney. There is a high degree of probability that this will lead to the collapse of the chimney.

As the compressed air feed through the air chute 6 is not interrupted during this process, the operating pressure in the silo rises to 1 atm (this is assisted by the volume of air introduced via pipe 33), and as soon as this minimum operating pressure is reached the control device 52 responds and opens the product conveyor line 8 as well as the bypass 18 by opening the electromagnetically adjustable shutoff valves 10 and 20.

When the chimney has in fact collapsed, normal feed conditions are restored and the pressure in the silo is close to the normal operating pressure. However, if the chimney has not collapsed, the internal pressure again drops, finally falls below the minimum operating pressure, and the process is repeated except that, in this case, controlled by the control device 52, it is not the same group of nozzles as previously which is put into operation, but instead the next group and on the next occasion it is finally the third group and so on cyclically so that after three cycles all three groups of nozzles 29, 30 and 31 have been activated once. The groups of nozzles are distributed around the periphery of the hopper 3 in such a way that, not later than after three cycles, an air surge has acted on each and every obstruction which can be expected in practice and has broken it up.

The control device 52 can also be omitted and instead the control operations performed by this control device can be started by hand, with reference to the pressure indication of pressure sensor 50. The electromagnetically adjustable shutoff valves 10, 20, 37, 40 and 42 are to this end equipped with means for manual operation and a pressure indication is provided for pressure sensor 50.

The pressure at which compressed air is stored in the air chamber 22, in the present embodiment 6 atm, is preferably two to four times as high as the maximum operating pressure, in the embodiment 2 atm.

As a modification of the described embodiment, the operating values can also differ, as can be gathered from the following Table in which in column 1 the operating values of the above-described embodiment are repeated, and in the following columns the corresponding values for other examples.

material through the conveyor line as long as the pressure in the silo is between a predetermined maximum and a predetermined minimum value; closing the conveyor line when the pressure in the silo drops below said minimum value, particularly as a result of bridging of material in the silo and/or the formation of chimneys; admitting into the silo compressed air at least at one location above the foraminous portion of the hopper for an interval of 0.5 to 1 second and at a second rate which is between ten and twenty times said first rate, the maximum quantity of air which is admitted into the silo on the time average basis being at most equal to said predetermined quantity; and opening the conveyor line when the pressure in the silo rises above said minimum value.

2. A process as defined in claim 1, wherein said interval is 0.5 second.

3. A process as defined in claim 1, wherein said second rate is ten times said first rate.

4. A process as defined in claim 1, further comprising the step of continuing with the admission of air through the foraminous portion of the hopper during admission of air at said second rate.

5. A process as defined in claim 1, further comprising the step of establishing and maintaining a supply of air at a pressure which is at least two times said maximum value, said second admitting step including drawing compressed air from said supply.

6. A process as defined in claim 1, wherein said second admitting step includes admitting compressed air into the silo in several stages, always at a plurality of

| Operating value | Example 1 | Example 2 | Example 3 |
|---|---|---|---|
| Starting pressure of compressor | 6 atm | 6 atm | 6 atm |
| Max. air feed capacity of compressor, based on 6 atm | 22 l/sec. | 30 l/sec. | 30 l/sec. |
| Air chamber capacity | 100 l | 200 l | 1000 l |
| Opening cycle of shutoff valves 37, 40, 42 | 0.5 sec. | 1 sec. | 1 sec. |
| Volume of air discharged from the air chamber during an opening cycle, based on 6 atm | 80 l | 180 l | 900 l |
| Flow rate of the air blown into the silo from the nozzles of the activated group of nozzles 29, 30, 31 immediately after the nozzle openings | 100 m/sec. | 30 m/sec. | 80 m/sec. |
| Volume of air, based on 1 atm necessary to ensure a completely satisfactory pneumatic conveying in the product conveyor line 8 | 24 l/sec. | 30 l/sec. | 150 l/sec. |
| Lower operating pressure threshold value | 1.0 atm. | 1.1 atm. | 1.0 atm. |
| Normal operating pressure value | 1.7 atm. | 1.6 atm. | 1.7 atm. |
| Upper operating pressure threshold value | 2.0 atm. | 2.0 atm. | 2.0 atm. |

What is claimed is:

1. A process for evacuating pneumatically conveyable bulk material from the downwardly tapering hopper of a silo into a pneumatic conveyor line whose capacity to effectively convey material from the silo is limited by a predetermined maximum quantity of air flowing therethrough per unit of time and which communicates with a foraminous portion of the hopper, comprising the steps of continuously admitting compressed air through the foraminous portion of the hopper at a first rate per volume to loosen the material in the hopper and to effect the entry of material into and the evacuation of different locations disposed above the foraminous portion of the hopper and spaced apart from each other, as considered in the circumferential direction of the silo.

7. A process as defined in claim 1, wherein said second admitting step includes individually admitting compressed air seriatim at a plurality of discrete locations above the foraminous portion of the hopper.

8. A process as defined in claim 1, further comprising the steps of admitting compressed air to said conveyor line along a path other than by way of the hopper and regulating the rate of admission of air along said path.

* * * * *